United States Patent
Sha et al.

(10) Patent No.: US 10,621,302 B2
(45) Date of Patent: Apr. 14, 2020

(54) CLASSIFICATION AND LOCALIZATION OF HOTSPOTS IN INTEGRATED PHYSICAL DESIGN LAYOUTS

(71) Applicant: INTERNATIONAL BUSINESS MACHINES CORPORATION, Armonk, NY (US)

(72) Inventors: Jing Sha, White Plains, NY (US); Dongbing Shao, Wappingers Falls, NY (US); Martin Burkhardt, White Plains, NY (US); Michael A. Guillorn, Cold Springs, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/020,417

(22) Filed: Jun. 27, 2018

(65) Prior Publication Data

US 2020/0004918 A1 Jan. 2, 2020

(51) Int. Cl.
*G06F 17/50* (2006.01)
*G03F 7/20* (2006.01)

(52) U.S. Cl.
CPC ...... *G06F 17/5081* (2013.01); *G03F 7/70433* (2013.01); *G06F 2217/12* (2013.01)

(58) Field of Classification Search
USPC ........................................................ 716/55
See application file for complete search history.

(56) References Cited

U.S. PATENT DOCUMENTS

| | | | |
|---|---|---|---|
| 8,402,397 B2 | 3/2013 | Robles et al. | |
| 8,464,194 B1 | 6/2013 | Agarwal et al. | |
| 8,732,629 B2 | 5/2014 | Tong | |
| 9,626,459 B2 | 4/2017 | Agarwal et al. | |
| 2009/0144691 A1* | 6/2009 | Rathsack | H01L 22/20 716/56 |
| 2013/0031518 A1* | 1/2013 | Robles | G06F 17/5081 716/52 |
| 2014/0358830 A1* | 12/2014 | Chiang | G06K 9/4685 706/12 |
| 2015/0213374 A1* | 7/2015 | Agarwal | G06F 17/50 706/12 |

OTHER PUBLICATIONS

Yibo Lin et al., Machine Learning for Mask/Wafer Hotspot Detection and Mask Synthesis, Photomask Technology, Oct. 2017.
(Continued)

*Primary Examiner* — Bryce M Aisaka
(74) *Attorney, Agent, or Firm* — Tutunjian & Bitetto, P.C.; Vazken Alexanian (57) ABSTRACT

Methods and systems for fabricating an integrated circuit include training a machine learning model using a training set that includes known physical design layout patterns that are classified according to whether the patterns include a hotspot. It is determined whether an input physical design layout pattern includes a hotspot using the machine learning model. A hotspot localization is generated for the input physical design layout patterns. The input physical design pattern is adjusted to cure the hotspot. A circuit is fabricated in accordance with the adjusted input physical design layout pattern.

17 Claims, 8 Drawing Sheets

(56) References Cited

OTHER PUBLICATIONS

Tetsuaki Matsunawa et al., Automatic Layout Feature Extraction for Lithography Hotspot Detection Based on Deep Neural Network, Design-Process-Technology Co-optimization for Manufacturability X, Mar. 2016.

Jea Woo Park et al., Litho-aware Machine Learning for Hotspot Detection, IEEE Transactions on Computer-Aided Design of Integrated Circuits and Systems, Sep. 2017.

Ramprasaath R. Selvaraju, Grad-CAM:Visual Explanations from Deep Networks via Gradient-based Localization, Computer Science > Computer Vision and Pattern Recognition, Mar. 2017.

Moojin Shin et al., CNN Based Lithography Hotspot Detection, International Journal of Fuzzy Logic and Intelligent Systems, Sep. 2016.

Haoyu Yang et al., Layout Hotspot Detection with Feature Tensor Generation and Deep Biased Learning, 2017 54th ACM/EDAC/IEEE Design Automation Conference (DAC), Austin, TX, Jun. 2017.

Haoyu Yang et al., Imbalance aware lithography hotspot detection: a deep learning approach, J. Micro/Nanolith. MEMS MOEMS, Jul.-Sep. 2017.

\* cited by examiner

CLASSIFICATION AND LOCALIZATION OF HOTSPOTS IN INTEGRATED PHYSICAL DESIGN LAYOUTS

BACKGROUND

Technical Field

The present invention generally relates to integrated circuit design and, more particularly, to fabricating integrated circuits that address potential hot spots using machine learning.

Description of the Related Art

As component sizes progressively decrease and as the complexity of integrated circuit designs increases, it becomes more difficult to guarantee that the circuit design meets all practical manufacturability requirements. As a result, a circuit design may not be manufacturable or may be inoperable in its first iteration, necessitating extensive testing and iterative design revisions. In particular, semiconductor manufacturing processes will often run into "hotspots," which represent manufacturing errors such as, e.g., pinching, bridging, and missing patterns, which could lead to failure of fabricated devices. A hotspot does not necessarily identify a particular circuit component, but instead identifies a region of the design layout that is associated with some problem in downstream manufacturing or operation.

Existing approaches to hotspot identification, such as process simulation and geometric verification, are each lacking in significant ways. Process simulation generates simulated layout pattern contours which are then used to check for hotspots. Such simulations are resource-intensive and time-consuming when evaluating larger layouts. Furthermore, the accuracy of the resulting hotspot classification depends on the quality of the simulation, with hotspots potentially being missed if the simulation is lacking.

Geometric verification uses a set of known features associated with hotspots, for example by evaluating geometric similarity of a test layout pattern with registered hotspot patterns. Pattern matching methods in particular are only useful for known hotspot configurations and are inadequate for identifying previously unknown hotspots.

In addition, both process simulation and geometric verification are generally limited to the detection of intra-layer hotspots that are confined to a single layer of physical design layout. Inter-layer hotspots are even more computationally expensive to detect by process simulation and are nearly impossible to detect by geometric verification.

SUMMARY

A method for fabricating an integrated circuit includes training a machine learning model using a training set that includes known physical design layout patterns that are classified according to whether the patterns include a hotspot. It is determined whether an input physical design layout pattern includes a hotspot using the machine learning model. A hotspot localization is generated for the input physical design layout patterns. The input physical design patterns is adjusted to cure the hotspot. A circuit is fabricated in accordance with the adjusted input physical design layout pattern.

A method for fabricating an integrated circuit includes training a convolutional neural network using a training set that includes known multi-layer physical design layout patterns that are classified according to whether the patterns include a hotspot. It is determined whether an input multi-layer physical design layout pattern includes a hotspot using the convolutional neural network on all layers of the multi-layer circuit physical layout patterns simultaneously. The hotspot in the input physical design layout pattern is verified using a simulation after determining that the input physical design layout pattern includes a hotspot using the convolutional neural network. A hotspot heat map is generated for the input multi-layer physical design layout pattern that shows regions with a higher likelihood of a hotspot as a higher heat map intensity. The input physical design pattern is adjusted to cure the hotspot. A circuit is fabricated in accordance with the adjusted input multi-layer physical design layout pattern.

A system for fabricating an integrated circuit includes a training module configured to train a machine learning model using a training set that includes known physical design layout patterns that are classified according to whether the patterns include a hotspot. The machine learning model is configured to determine whether an input physical design layout pattern includes a hotspot using the machine learning model and to generate a hotspot localization for the input physical design layout pattern. A layout adjustment module is configured to adjust the input physical design pattern to cure the hotspot. A fabrication module is configured to trigger fabrication of a circuit in accordance with the adjusted input physical design layout pattern.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention employ machine learning in the form of, e.g., deep neural networks, to automatically classify and localize hotspots in design layouts without simulation. A model is built based on training data of layout patterns and their labels to automatically extract features of hotspots from layouts and to localize which part of a given layout leads the model to its classification decision. The present embodiments thereby automatically and rapidly perform simultaneous classification and localization, detecting hotspots at any process step (e.g., including lithography and etch hotspots).

Toward that end, the present embodiments make use of training data that associates patterns of exemplary physical design layouts with a pre-determined classification of whether each pattern includes one or more hotspots. A deep convolutional neural network (CNN) may be used to build the model, though it should be understood that other forms of machine learning may be used instead. The model is then used for unclassified design layout patterns and generates a hotspot classification for each pattern of the unclassified design layout and localizes such hotspots. It is specifically contemplated that hotspot localization may be performed by generating a heat map that overlays the design layout to assist a designer in identifying the design features that create the hotspot.

The design layout of the present embodiments can include multiple layers. The model can then be trained to perform classification across all of the layers at the same time, providing multiple channels for classification and localization. The model can identify hotspots that may result from overlay errors from specific layers of integrated multi-layer layouts.

Figure 1:
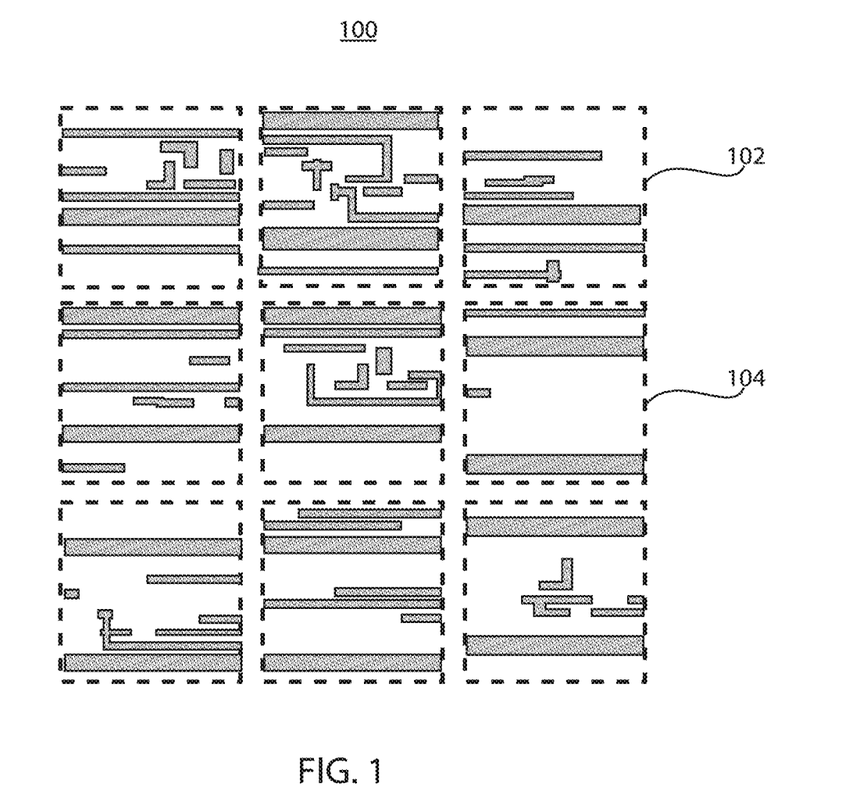
FIG. 1 is a diagram of an exemplary set of single-layer physical design layout patterns that are classified according to whether or not they include hotspots in accordance with an embodiment of the present invention.

Referring now to FIG. 1, an exemplary set of single-layer design layout patterns is shown. In this example, a full design layout is broken up into patterns 100 of any appropriate size and shape. The patterns 100 are clipped out at different locations of the design layout in a field-of-view (FOV) of the same size. In one example, the patterns 100 may be images having known dimensions (e.g., 100×100 pixels), but it should be understood that patterns of other sizes may be used instead.

The patterns 100 are classified into patterns that include hotspots 102 (shown with dashed borders) and patterns that do not include hotspots 104 (shown with solid borders). As will be addressed in greater detail below, each of these patterns 100 may be single-layered or may alternatively have multiple layers associated with it. Each hotspot pattern 102 may have any number of hotspots (e.g., one or more) that have been identified by any appropriate mechanism, including process simulation or experiment (e.g., fabrication on wafer). The exact locations of the hotpots in the layout patterns are not needed for training a deep neural network model.

Patterns 100 may form a set of training data that is used to train a machine learning model. In one specific example, the training data may be formed from a dataset that includes a subset of hotspot patterns 102 and another subset of non-hotspot patterns 104. This exemplary set of training data may then be divided into initial training data and validation data. In one example, some of the patterns may be used for initial training and the rest of the patterns may be used for validation. The initial training patterns are used to train the machine learning model and the validation patterns are used to confirm the generalization of the model, with divergences being used to further train the model.

It should be noted that the classification of the patterns 102 may further specify different kinds of hotspots. In such embodiments, the patterns may be classified with a first value (e.g., 0) to indicate that no hotspots are present, a second value (e.g., 1) to indicate that a hotspot of a first type is present, a third value (e.g., 2) to indicate that a hotspot of a second type is present, and so on. The machine learning model will then indicate whether a hotspot is present and, further, indicate which type of hotspot is present by labeling an input layout pattern appropriately.

Figure 2:
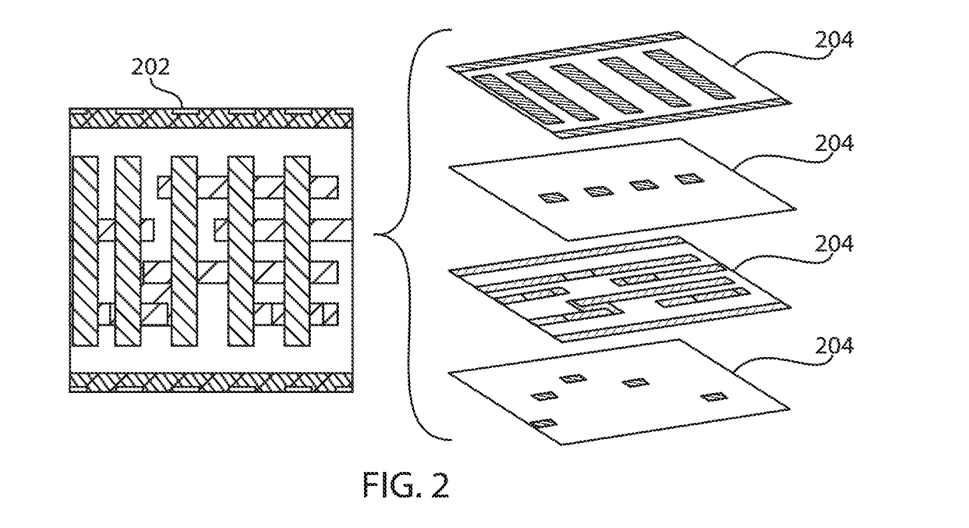
FIG. 2 is a diagram of a multi-layer physical design layout pattern in accordance with an embodiment of the present invention.

Referring now to FIG. 2, an exemplary integrated multi-layer layout pattern 202 is shown. The integrated multi-layer layout pattern 202 may be obtained from a larger physical design layout as described above in FIG. 1. The integrated multi-layer layout pattern 202 is a combination of multiple single layers 204, each of which may represent, for example, a separate layer of a physical design layout for an integrated circuit (IC), such that each layer 204 occupies a different physical plane. Some layers may include discrete circuit components, while others may include only vias and interconnects. When combined into a multi-layer layout pattern 202, these individual layers 204 form a cohesive whole. The integrated multi-layer layout pattern 202 may or may not include hotspots, which represent problem areas of the design layout. A hotspot may reflect, for example, a design feature that will result in an error during fabrication.

The physical design layout pattern 202 is therefore presented as a superposition of the different individual layers 204 and may be represented as a three-dimensional array. Some of the layers 204 may, for example, include metal layers that illustrate metal features of a patterned structure, while others may show vias that interconnect metal features of the metal layers. Embodiments of the present principles capture the correlation between the different layers 204 of an integrated, multi-layer layout pattern 202, for example between features of the layers 204, and thus detect and localize inter-layer hotspots that arise from the interplay between multiple different layers. Similar to single-layer embodiments, each of the three-dimensional arrays represents that represent integrated, multi-layer layout patterns is also labeled as either having a hotspot or as having no hotspots.

Each layer of the multi-layer layout pattern 202 may be regarded as a separate channel. Whereas conventional image classification by machine learning implementations are limited to a certain number of color channels, as in the case of RGB and CMYK images, the present embodiments can employ any number of distinct separate layers 204. The present embodiments thereby capture correlations between the structures of the different layers 204.

Each layer 204 may then be regarded as a two-dimensional array of elements having dimensions W×H. Each element may have a binary value, representing the presence or absence of a particular feature, or may alternatively have a value in some continuous range. Thus, in the example of a metal layer, each element may represent the presence of metal as a 1 and the absence of metal as a 0. Similarly, a via layer may represent the presence of a via as a 1 and the absence of a via as a 0. It should be noted that metal layers and via layers are just two examples of the kinds of structures that may be represented by the layers of the layout pattern patterns, with the values in other types of layers representing other kinds of layout features. In such an embodiment, the integrated multi-layer layout pattern 202 may be represented as a collection of two-dimensional arrays or as a three-dimensional array of size W×H×N, where N is the number of layers. The two-dimensional arrays may thus be "stacked" to form the three-dimensional array.

Figure 3:
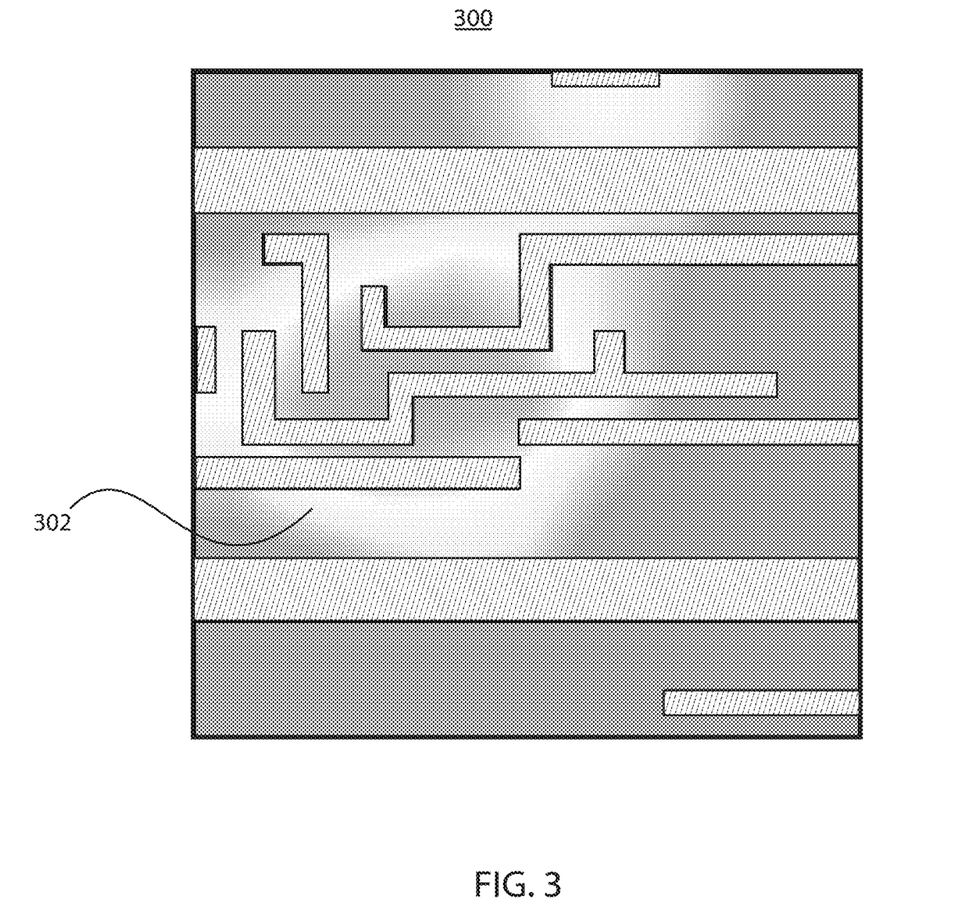
FIG. 3 is a diagram of a heat map localizing a hotspot in a physical design layout pattern in accordance with an embodiment of the present invention.

Referring now to FIG. 3, an exemplary output 300 of the model is shown. This single-layer layout pattern 302 is classified by the deep neural network model as having a hotspot. The model furthermore generates a heat map 302 that localizes the hotspot within the layout pattern 302. A heat map indicates which parts of a given layout pattern lead the trained deep neural network model to its final classification decision, in this case showing with greater intensity the region in which the hotspot occurs. It should be understood that the heat map 302 may indicate a sub-threshold likelihood of a hotspot in a pattern that does not include a hotspot. The threshold for identifying whether or not the pattern includes a hotspot is a parameter that may be set by the operator and that may be tuned to reflect the accuracy of the output with a particular design. It should be appreciated that similarly for integrated multi-layer layout patterns, hotspots are classified and localized by the trained machine learning model.

Figure 4:
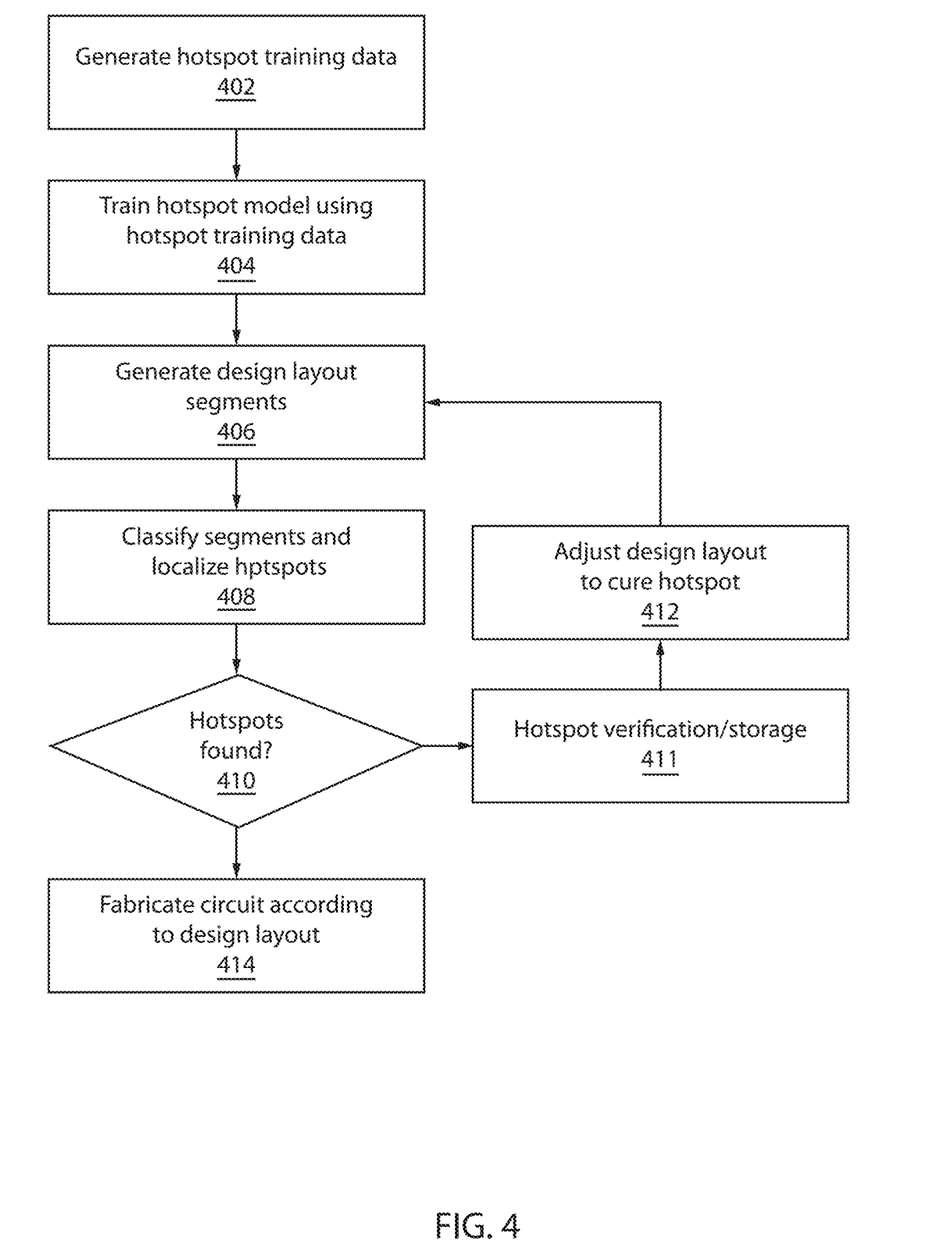
FIG. 4 is a block/flow diagram of a method for detecting and curing hotspots in a physical design layout before fabrication in accordance with an embodiment of the present invention.

Referring now to FIG. 4, a method of fabricating circuits without hotspots is shown. In block 402, a corpus of hotspot training data is generated by, e.g., simulation of various design layouts or through experiment. It should be appreciated that the pattern "images" that make up the training data can be single-layer layout patterns or 3D arrays of integrated multi-layer layout patterns for detecting intra-layer or inter-layer hotspots. In addition, the training data may be labeled simply as hotspot-free or hotspot-containing. Some embodiments may further classify the training data according to different hotspot types. The training data need not specify where hotspots are located within layout patterns for training purposes.

The hotspot training data is then used to train the hotspot model using any appropriate deep learning system such as, e.g., a CNN. Block 406 then takes an input design layout and splits it into patterns that represent different portions of the layout. The input physical design layout may be broken into single-layer or multi-layer layout pattern images, in the same image- or array-size as the training data, in overlapping or abutting fields of view. Following the examples described above, a multi-layer layout pattern may be represented as a set of separate two-dimensional arrays or as a stacked three-dimensional array.

Block 408 uses the hotspot model to classify the patterns and to localize hotspots. Each pattern is provided as an input to the model, which classifies the pattern as to whether it includes one or more hotspots and generates a heat map that localizes the hotspot(s) within the pattern. The generation of the heat map may be performed by any appropriate process including, e.g., gradient-weighted class activation mapping, which is based on the trained weights of a neural network in the model to localize the hotspots. The heat map, which may be represented as a class activation heat map, is a two-dimensional grid of scores associated with a specific output class (e.g., hotspot-free, hotspot-containing, etc.). The heat map is computed for every location in any input layout pattern image and indicates which parts of a given pattern image led the trained deep neural network to its final classification decision.

Thus, given an input layout pattern image or three-dimensional array, block 408 takes the output feature map of, e.g., a convolution layer and weighs every channel in that feature map by the gradient of the class with respect to the channel. Not only does this help locate hotspots, but it also assists in debugging the trained model in the event of a hotspot classification error.

If block 410 determines that one or more hotspots were detected, block 411 performs hotspot verification on the specific pattern in question. Verification may include process simulation or manufacturing a test wafer to determine whether the machine learning model correctly identified a hotspot. If the hotspot is verified, block 411 may then store the pattern in a library of known hotspot patterns, which can later be used for pattern-based hotspot detection. Block 412 adjusts the design layout to cure the hotspot(s). The adjustment may be performed manually by the designer or may, alternatively, be performed automatically by, e.g., rerouting conductive paths or moving components. The classification process is then repeated on the adjusted design layout until block 410 determines that there are no hotspots present. At this stage, block 414 fabricates the circuit according to the adjusted design layout.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The present embodiments employ, e.g., artificial neural networks (ANNs) to provide image classification. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

It should be understood that neural networks are flexible constructs that can take many different forms. However, the universal approximation theorem states that a feed-forward network can represent a wide variety of real-valued functions. Thus, while a specific embodiment of an analog-valued, hardware-based ANN is provided below, it should be understood that the present embodiments may alternatively be implemented using software deep neural network that is implemented on general-purpose processing hardware such as, e.g., a graphics processing unit (GPU).

Figure 5:
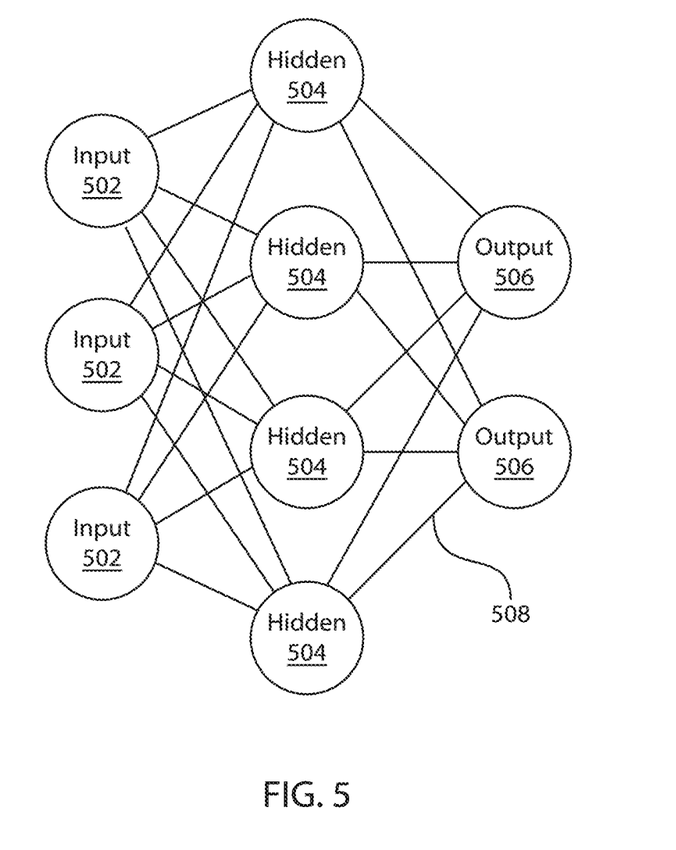
FIG. 5 is a diagram of a general neural network in accordance with an embodiment of the present invention.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted and these weighted inputs are then processed by the hidden neurons 504 according to some function in the hidden neurons 504, with weighted connections 508 between the layers. There may be any number of layers of hidden neurons 504, and as well as neurons that perform different functions. There exist different neural network structures as well, such as convolutional neural network, maxout network, etc. Finally, a set of output neurons 106 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error. This represents just one variety of ANN.

Figure 6:
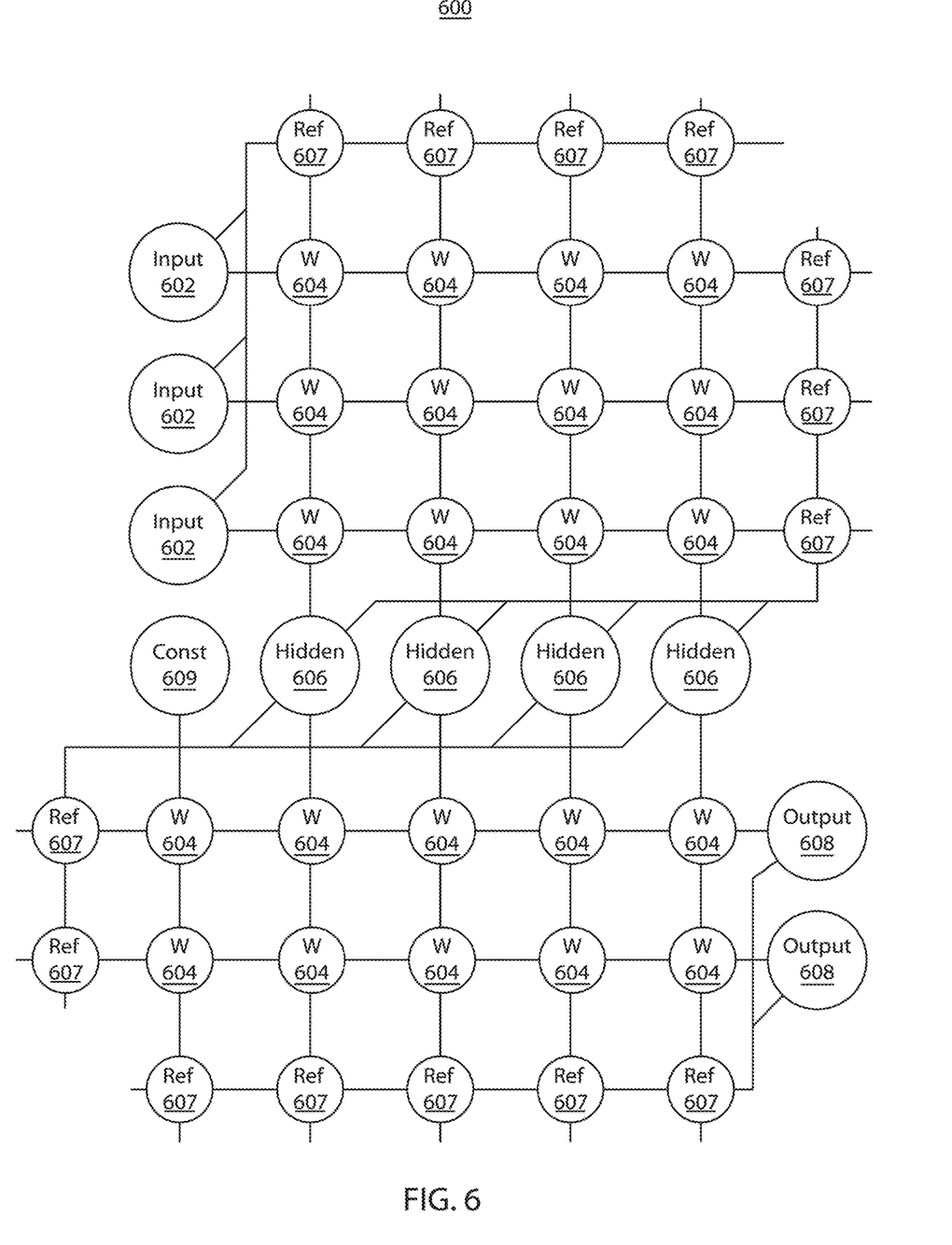
FIG. 6 is a diagram of a general neural network that illustrates the interaction of neurons and weights in accordance with an embodiment of the present invention.

Referring now to the drawings in which like numerals represent the same or similar elements and initially to FIG. 6, an ANN architecture 600 is shown. It should be understood that the present architecture is purely exemplary and that other architectures or types of neural network may be used instead. In particular, the representations shown in FIGS. 5 and 6 are not meant to be descriptive of a representative neural network according to the present embodiments but are, instead, intended to provide a general understanding of the structure and function of ANNs. Although the description is of ANNs is provided with respect to hardware implementations that employ resistive crosspoint devices, ANNs can also be implemented in software.

During feed-forward operation, a set of input neurons 602 each provide an input voltage in parallel to a respective row of weights 604. The weights 604 each have a settable resistance value, such that a current output flows from the weight 604 to a respective hidden neuron 606 to represent the weighted input. The current output by a given weight is determined as I=V/r, where V is the input voltage from the input neuron 602 and r is the set resistance of the weight 604. The current from each weight adds column-wise and flows to a hidden neuron 606. A set of reference weights 607 have a fixed resistance and combine their outputs into a reference current that is provided to each of the hidden neurons 606. Because conductance values can only be positive numbers, some reference conductance is needed to encode both positive and negative values in the matrix. The currents produced by the weights 604 are continuously valued and positive, and therefore the reference weights 607 are used to provide a reference current, above which currents are considered to have positive values and below which currents are considered to have negative values.

As an alternative to using the reference weights 607, another embodiment may use separate arrays of weights 604 to capture negative values. Each approach has advantages and disadvantages. Using the reference weights 607 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 604 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 606 use the currents from the array of weights 604 and the reference weights 607 to perform some calculation. The hidden neurons 606 then output a voltage of their own to another array of weights 604. This array performs in the same way, with a column of weights 604 receiving a voltage from their respective hidden neuron 606 to produce a weighted current output that adds row-wise and is provided to the output neuron 608.

It should be understood that any number of these stages may be implemented, by interposing additional layers of arrays and hidden neurons 606. It should also be noted that some neurons may be constant neurons 609, which provide a constant voltage to the array. The constant neurons 609 can be present among the input neurons 602 and/or hidden neurons 606 and are only used during feed-forward operation.

During back propagation, the output neurons 608 provide a voltage back across the array of weights 604. The output layer compares the generated network response to training data and computes an error. The error is applied to the array as a voltage pulse, where the height and/or duration of the pulse is modulated proportional to the error value. In this example, a row of weights 604 receives a voltage from a respective output neuron 608 in parallel and converts that voltage into a current which adds column-wise to provide an input to hidden neurons 606. The hidden neurons 606 combine the weighted feedback signal with a derivative of its feed-forward calculation and stores an error value before outputting a feedback signal voltage to its respective column of weights 604. This back propagation travels through the entire network 600 until all hidden neurons 606 and the input neurons 602 have stored an error value.

During weight updates, the input neurons 602 and hidden neurons 606 apply a first weight update voltage forward and the output neurons 608 and hidden neurons 606 apply a second weight update voltage backward through the network 600. The combinations of these voltages create a state change within each weight 604, causing the weight 604 to take on a new resistance value. In this manner the weights 604 can be trained to adapt the neural network 600 to errors in its processing. It should be noted that the three modes of operation, feed forward, back propagation, and weight update, do not overlap with one another.

In one particular embodiment, the weights 604 may be implemented in software or in hardware, for example using relatively complicated weighting circuitry or using resistive cross point devices. Resistive cross point devices may be implemented with resistive random access memory (RRAM), phase change memory (PCM), programmable metallization cell (PMC) memory, or any other device that has non-linear resistive switching characteristics.

As noted above, it is specifically contemplated that the ANN may take the form of a CNN. A CNN may include, among the hidden layers, convolutional layers, pooling layers, fully connected layers, and normalization layers. The CNN performs a cross-correlation to identify features of circuit design layouts that correspond to hotspots. The CNN is also able to process multiple channels simultaneously. Whereas conventional image processing is generally limited to three or four layers (corresponding to color channels), the present embodiments make use of arbitrary numbers of channels (corresponding to the individual layers in a particular segment).

Figure 7:
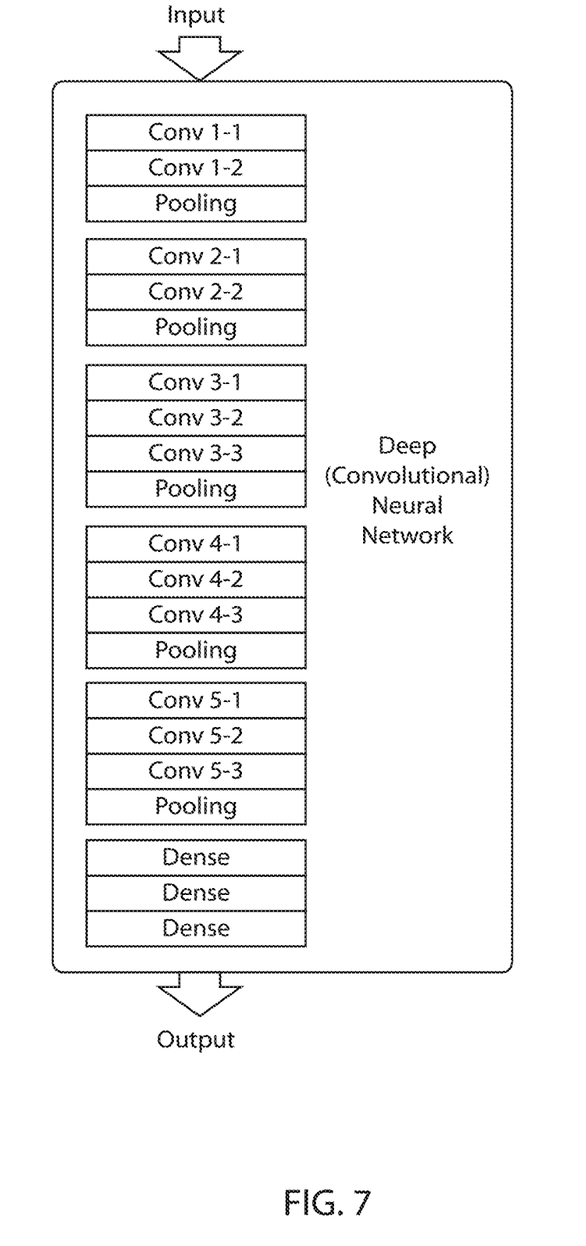
FIG. 7 is a diagram of an exemplary architecture of a deep neural network model in the form of a convolutional neural network, adapted to classify and localize hotspots in accordance with an embodiment of the present invention.

Referring now to FIG. 7, an exemplary deep CNN is shown that illustrates with greater specificity the kinds of layers that may be used. It should be understood that this embodiment is provided for the purposes of illustration and that machine learning architectures may be used instead. For example, the deep CNN shown in FIG. 7 employs convolutional layers (labeled "Cony"), pooling layers (labeled "Pooling"), and fully connected layers (labeled "Dense"). The characteristics of the CNN may be determined as hyperparameters that include, for example, the number of neural network layers, the type of neural network layers, the number of neurons in each neural network layer, the numbers and sizes of filters, etc. The values for the hyperparameters may be based on factors such as input multi-layer integrated patterns, training accuracy targets, available computing resources, etc.

Figure 8:
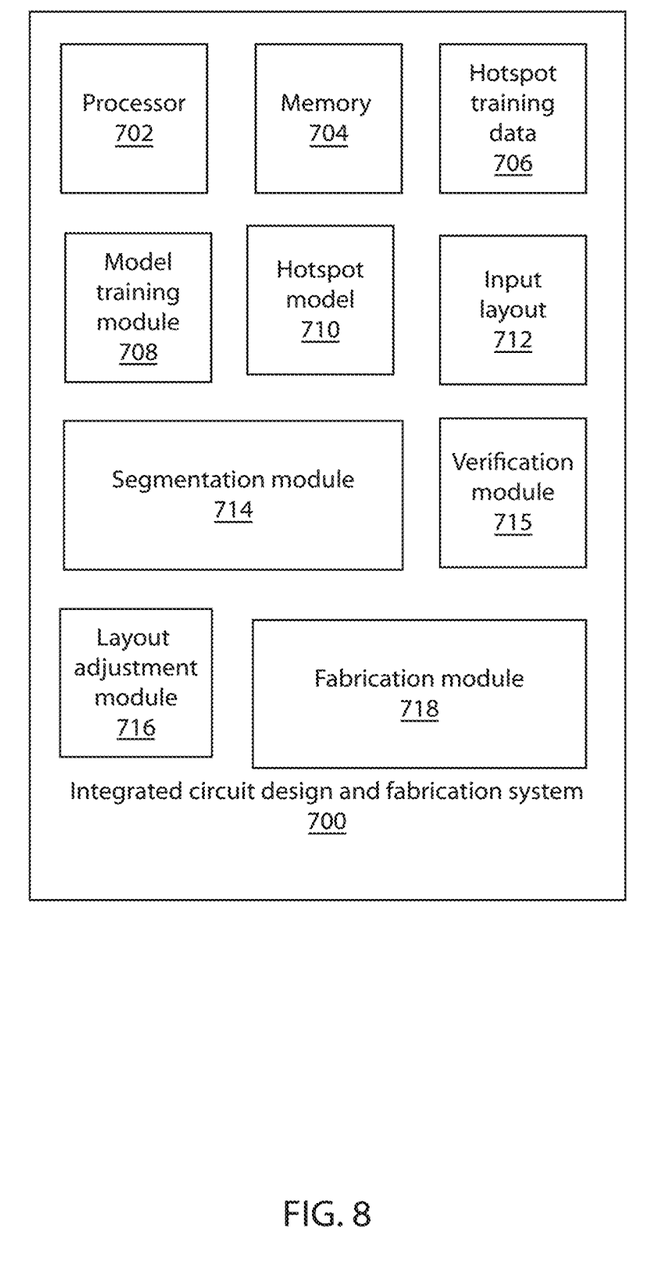
FIG. 8 is a block diagram of a hotspot classification and localization system in accordance with an embodiment of the present invention.

Referring now to FIG. 8, an integrated circuit design and fabrication system 700 is shown. The system 700 includes a hardware processor 702 and memory 704. The system 700 further includes several functional modules that may, in some embodiments, be implemented as software that is stored in memory 704 and executed by processor 702. In other embodiments, the functional modules may be implemented as one or more discrete hardware components in the form of, e.g., application-specific integrated chips or field programmable gate arrays.

Hotspot training data 706 is stored in the memory 704 and includes a set of individual layout segments (each having one or more layers) that are marked as including one or more hotspots or as including no hotspots. A model training module 708 trains the hotspot classification and localization model 710 using the hotspot training data 706.

Segmentation module 714 accepts an input layout 712 and splits it into segments, each including one or more layers. The hotspot model 710 then classifies the segmented input layout to determine which segments include hotspots and furthermore localizes the hotspots within their respective segments using a heat map. New layout patterns that are classified as hotspots by the hotspot model 710 may be stored in a database in memory 704 for documentation and manufacturability study. Verification module 715 triggers process simulations of classified layout patterns or experimental fabrication of the layout patterns on a wafer to confirm the existence and localization of predicted hotspots.

Layout adjustment module 716 alters the input layer 712 to cure the hotspot(s). Once there are no hotspots remaining, fabrication module 718 triggers fabrication of the circuit according to the adjusted circuit design layout. The fabrication module 718 may itself include the appropriate machinery to perform the fabrication or may, alternatively, simply initiate the fabrication process in a separate device or facility.

Figure 9:
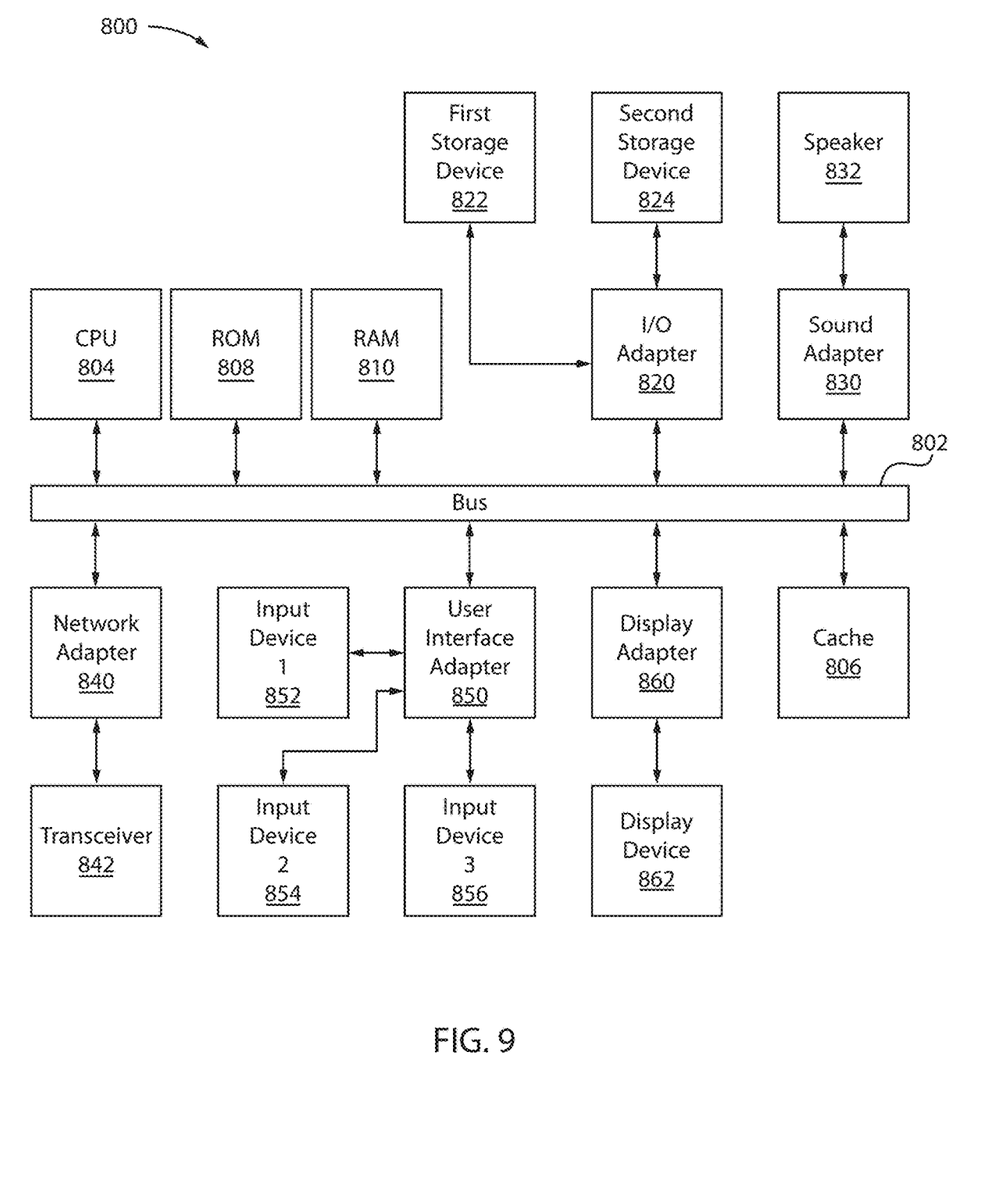
FIG. 9 is a block diagram of a processing system in accordance with an embodiment of the present invention.

Referring now to FIG. 9, an exemplary processing system 800 is shown which may represent the integrated circuit design and fabrication system 700. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for fabricating an integrated circuit, comprising:
   training a machine learning model using a training set that includes known physical design layout patterns that are classified according to whether the patterns include a hotspot;

determining whether an input physical design layout pattern, having a plurality of stacked layers, includes an inter-layer hotspot using the machine learning model;

generating a hotspot localization for the input physical design layout patterns;

adjusting the input physical design pattern to cure the hotspot; and fabricating a circuit in accordance with the adjusted input physical design layout pattern.

2. The method of claim 1, further comprising segmenting an input physical design layout into a plurality of input physical design layout patterns, wherein said determining, generating, and adjusting are repeated for each of the plurality of input physical design layout patterns before fabrication of the circuit.

3. The method of claim 1, wherein determining whether the input physical design layout patterns include an inter-layer hotspot comprises considering all of the plurality of layers simultaneously.

4. The method of claim 1, wherein the machine learning model comprises a convolutional neural network configured to determine whether the input physical design layout pattern includes one or more hotspots.

5. The method of claim 1, wherein generating a hotspot localization comprises generating a heat map overlay for the physical design layout pattern that shows regions with a higher likelihood of a hotspot as a higher heat map intensity.

6. The method of claim 1, wherein a hotspot represents an area of a physical design layout pattern that is not manufacturable or that render the circuit inoperable.

7. The method of claim 1, wherein adjusting the input physical design pattern comprises an action selected from the group consisting of moving circuit components and rerouting conductive paths.

8. The method of claim 1, further comprising verifying that the input physical design layout pattern includes a hotspot using a process simulation or fabrication on wafer after determining that the input physical design layout pattern includes a hotspot using the machine learning model.

9. A non-transitory computer readable storage medium comprising a computer readable program for fabricating an integrated circuit, wherein the computer readable program when executed on a computer causes the computer to perform the steps of:

training a machine learning model using a training set that includes known physical design layout patterns that are classified according to whether the patterns include a hotspot;

determining whether an input physical design layout pattern, having a plurality of stacked layers, includes an inter-layer hotspot using the machine learning model;

generating a hotspot localization for the input physical design layout patterns;

adjusting the input physical design pattern to cure the hotspot; and fabricating a circuit in accordance with the adjusted input physical design layout pattern.

10. A system for fabricating an integrated circuit, comprising:

a training module configured to train a machine learning model using a training set that includes known physical design layout patterns that are classified according to whether the patterns include a hotspot, wherein the machine learning model is configured to determine whether an input physical design layout pattern, having a plurality of stacked layers, includes an inter-layer hotspot using the machine learning model and to generate a hotspot localization for the input physical design layout pattern;

a layout adjustment module configured to adjust the input physical design pattern to cure the hotspot; and a fabrication module configured to trigger fabrication of a circuit in accordance with the adjusted input physical design layout pattern.

11. The system of claim 10, further comprising a segmentation module configured to segment an input physical design layout into a plurality of input physical design layout patterns, wherein the determination of the hotspot, generation of hotspot localization, and adjustment of the input physical design pattern are repeated for each of the plurality of input physical design layout patterns before fabrication of the circuit.

12. The system of claim 10, wherein the machine learning model is further configured to consider all of the plurality of layers simultaneously.

13. The system of claim 10, wherein the machine learning model comprises a convolutional neural network configured to determine whether the input physical design layout pattern includes one or more hotspots.

14. The system of claim 10, wherein the machine learning model is further configured to generate a heat map overlay for the layout pattern that shows regions with a higher likelihood of a hotspot as a higher heat map intensity.

15. The system of claim 10, wherein a hotspot represents an area of a physical design layout pattern that is not manufacturable or that render the circuit inoperable.

16. The system of claim 10, wherein the adjustment module is further configured to perform an action selected from the group consisting of moving circuit components and rerouting conductive paths.

17. The system of claim 10, further comprising a verification module configured to verify that the input physical design layout pattern includes a hotspot using a simulation after the determination that the input physical design layout pattern includes a hotspot.

* * * * *